US008483941B2

(12) United States Patent
Fu et al.

(10) Patent No.: US 8,483,941 B2
(45) Date of Patent: Jul. 9, 2013

(54) VEHICLE SPEED MONITOR

(75) Inventors: Bo Fu, Shaanxi (CN); Na Wang, Shaanxi (CN); Dangdang Zheng, Shaanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 299 days.

(21) Appl. No.: 12/849,828

(22) Filed: Aug. 4, 2010

(65) Prior Publication Data

US 2012/0035840 A1 Feb. 9, 2012

(51) Int. Cl.

| | |
|---|---|
| ***G06F 19/00*** | (2011.01) |
| ***G06G 7/70*** | (2006.01) |
| ***G06G 7/76*** | (2006.01) |
| ***G08G 1/00*** | (2006.01) |

(52) U.S. Cl.
USPC .......................................................... 701/119

(58) Field of Classification Search
None
See application file for complete search history.

(56) References Cited

U.S. PATENT DOCUMENTS

| | | | | |
|---|---|---|---|---|
| 6,308,134 | B1 * | 10/2001 | Croyle et al. | 701/472 |
| 6,606,033 | B1 * | 8/2003 | Crocker et al. | 340/901 |
| 7,859,392 | B2 * | 12/2010 | McClellan et al. | 340/441 |
| 2004/0143378 | A1 * | 7/2004 | Vogelsang | 701/35 |
| 2008/0269976 | A1 * | 10/2008 | Birgersson | 701/29 |

* cited by examiner

*Primary Examiner* — Paul Danneman
(74) *Attorney, Agent, or Firm* — Ren-Sheng International

(57) ABSTRACT

A vehicle speed monitor for monitoring the speed of a moving vehicle is provided to the vehicle at an entrance to a road. The vehicle speed monitor records instantaneous accelerations of the vehicle along three axes over time. The vehicle speed monitor may be implemented as a contact or contactless integrated circuit (IC) card. The vehicle speed monitor is returned at an exit from the road, and scalar instantaneous speeds of the vehicle are determined from the recorded instantaneous accelerations in the vehicle speed monitor. The scalar instantaneous speeds are compared to one or more speed limits between the entrance and the exit to determine any speed limit violation. The vehicle speed monitor may also function as an electronic toll card where a toll is determined from the entrance and the exit. At the exit, the driver of the vehicle is charged with a fine and a toll, if any.

19 Claims, 8 Drawing Sheets

VEHICLE SPEED MONITOR

BACKGROUND

According to numerous studies, speeding is one of the leading causes of traffic accidents. Accordingly, the control and the reduction of speed limit violations are important to public safety. There are numerous ways to determine the speed of a moving vehicle. For example, a police officer in a police vehicle can determine the speed of a moving vehicle by following the vehicle and monitoring the speedometer of the officer's vehicle. Alternatively, the police officer can use a radar gun or a light detection and ranging (LADAR) device to determine the speed of a moving vehicle.

SUMMARY

In accordance with one embodiment of the disclosure, a vehicle speed monitor for monitoring the speed of a moving vehicle includes an integrated circuit (IC) card, and the IC card includes an accelerometer measuring instantaneous accelerations of the vehicle along three axes, a nonvolatile memory, a contact or contactless interface, and a processor being programmed to record the instantaneous accelerations measured by the accelerometer over time in the nonvolatile memory and to transmit, via the contact or contactless interface, at least one of (1) the recorded instantaneous accelerations and (2) scalar instantaneous speeds over time determined from the recorded instantaneous accelerations.

In accordance with another embodiment of the disclosure, a system for monitoring the speed of a moving vehicle includes a vehicle speed monitor having an IC card and a computer system. The IC card includes an accelerometer measuring instantaneous accelerations of the vehicle along three axes, a nonvolatile memory, a contact or contactless interface, and a processor being programmed to record the instantaneous accelerations measured by the accelerometer over time in the nonvolatile memory. The computer system includes a contact or contactless reader and another processor being programmed to download from the IC card, via the contact or contactless reader, at least one of (1) the recorded instantaneous accelerations and (2) scalar instantaneous speeds over time determined from the recorded instantaneous accelerations, and to determine if a speed limit has been exceeded from the scalar instantaneous speeds.

In accordance with a further embodiment of the disclosure, a method for monitoring the speed of a moving vehicle includes providing a vehicle speed monitor comprising an IC card to the vehicle at an entrance to the road, wherein the IC card measures and records instantaneous accelerations of the vehicle along three axes over time, receiving the IC card at an exit from the road, downloading from the IC card, by contact or contactless communication, at least one of (1) the recorded instantaneous accelerations and (2) scalar instantaneous speeds over time determined from the recorded instantaneous accelerations, and determining if a speed limit has been exceeded from the scalar instantaneous speeds.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
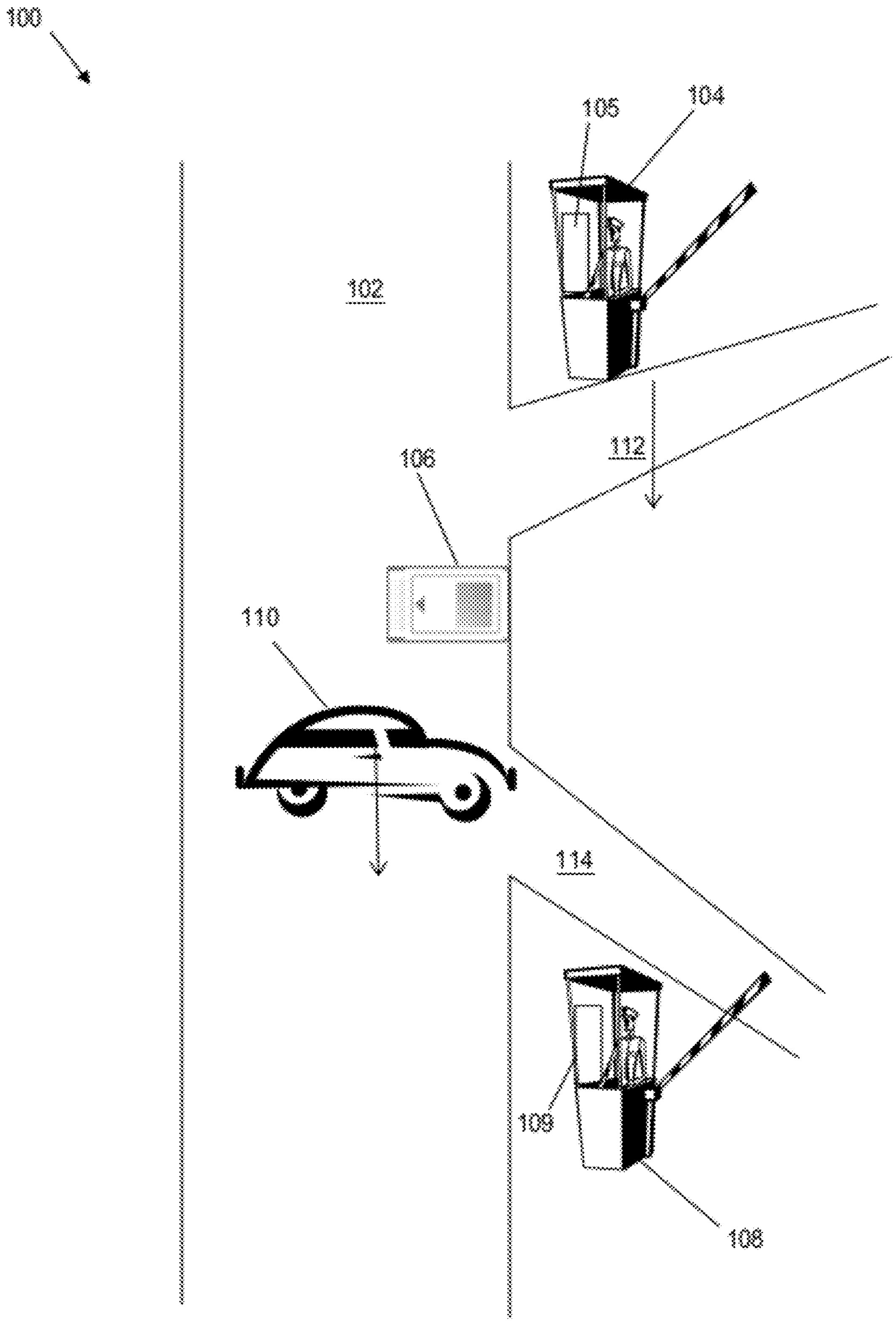
FIG. 1 shows a block diagram of an illustrative embodiment of a system for monitoring the speed of a moving vehicle.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to techniques, systems, and methods for monitoring vehicle speeds.

Embodiments of the disclosure provide a vehicle speed monitor suitable for monitoring vehicle speeds. The vehicle speed monitor may be provided to a vehicle at an entrance to a road. The vehicle speed monitor records instantaneous accelerations of the vehicle along three axes over time. The vehicle speed monitor may be implemented as a contact or contactless integrated circuit (IC) card. The vehicle speed monitor is returned at an exit from the road, and scalar instantaneous speeds of the vehicle are determined from the recorded instantaneous accelerations in the vehicle speed monitor. The scalar instantaneous speeds are compared to one or more speed limits between the entrance and the exit to determine any speed limit violation. The vehicle speed monitor may also function as an electronic toll card where a toll is determined from the entrance and the exit. At the exit, the driver of the vehicle is charged with a fine and a toll, if any.

Scalar instantaneous speeds may be determined from instantaneous accelerations along three axes as follows. The instantaneous accelerations along the three axes are components of an acceleration vector. The magnitudes of the acceleration vector, hereafter "scalar instantaneous accelerations," at each unit of time are determined from the instantaneous accelerations along the three axes at each unit of time. The magnitudes of the velocity vector, above and hereafter "scalar instantaneous speeds," at each unit of time are obtained by integrating the scalar instantaneous accelerations over time.

FIG. 1 shows a block diagram of an illustrative embodiment of a system 100 for monitoring the speed of a vehicle. The system 100 includes an entrance booth 104, a computer system 105 at the entrance booth, a vehicle speed monitor 106, an exit booth 108, and a computer system 109 at the exit booth.

The entrance booth 104 controls access to an entrance or onramp 112 for entering a road 102. Before allowing a vehicle 110 onto the road 102, a human or an automated attendant at the entrance booth 104 provides the vehicle speed monitor 106 to the driver or another occupant of the vehicle. The vehicle speed monitor 106 may be prerecorded with an ID of the onramp 112 or the computer system 105 may record the ID of the onramp into the vehicle speed monitor. The vehicle speed monitor 106 measures and records vehicle data such as instantaneous accelerations of the vehicle 110 along three axes over time. The vehicle speed monitor 106 may also function as an electronic toll card. The vehicle speed monitor 106 may be implemented as a contact or contactless IC card.

The exit booth 108 controls access to an exit or off ramp 114 for exiting from the road 102. Before allowing the vehicle 110 to exit the road 102, a human or an automated attendant at the exit booth 108 receives the vehicle speed monitor 106 from the driver or another occupant of the vehicle. The attendant at the exit booth 108 uses the computer system 109 to download, with or without contact, the vehicle data from the vehicle speed monitor 106 and determine if the vehicle 110 exceeded any speed limit between the onramp 112 and the off ramp 114. When the vehicle speed monitor 106 also functions as an electronic toll card, the attendant at the exit booth 108 uses computer system 109 to determine a toll for the vehicle 110 based on the onramp 112 and the off ramp 114.

Figure 2:
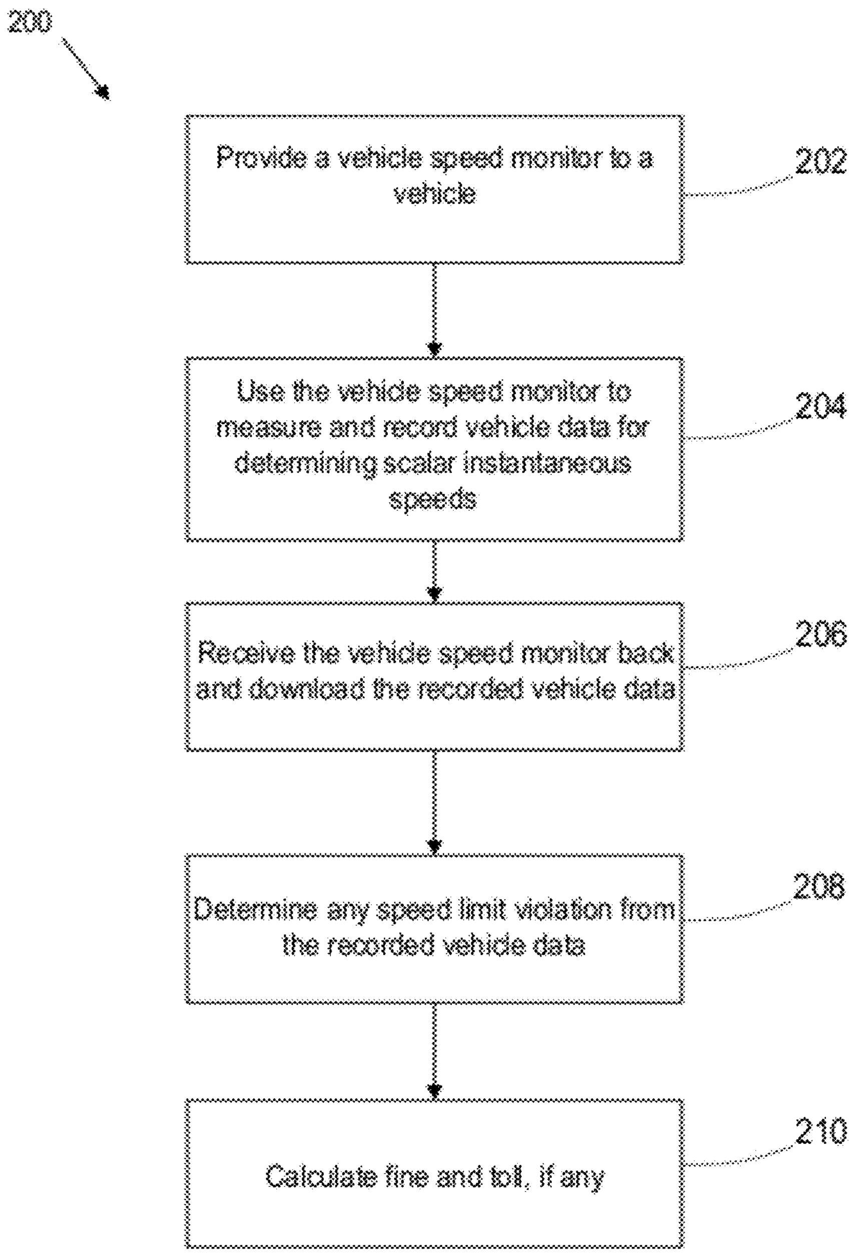
FIG. 2 is a flowchart of an illustrative embodiment of a method for monitoring the speed of a moving vehicle.

FIG. 2 is a flowchart of an illustrative embodiment of a method 200 for monitoring the speed of a moving vehicle. The method 200 may include one or more operations, functions or actions as illustrated by one or more of blocks 202, 204, 206, 208, and 210. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for the method 200 may begin at the block 202, "Provide a vehicle speed monitor to a vehicle." The block 202 may be followed by the block 204, "Use the vehicle speed monitor to measure and record vehicle data for determining scalar instantaneous speeds." The block 204 may be followed by the block 206, "Receive the vehicle speed monitor back and download the recorded vehicle data." The block 206 may be followed by the block 208, "Determine any speed limit violation from the recorded vehicle data." The block 208 may be followed by the block 210, "Calculate fine and toll, if any."

In the block 202, the vehicle speed monitor 106 is provided at the entrance booth 104 at the onramp 112 to the road 102 to the driver or another occupant of the vehicle 110. The vehicle speed monitor 106 may be placed in any orientation in the vehicle 110 as it uses an accelerometer 302 (described below with reference to FIG. 3) that measures instantaneous accelerations along three axes. As described earlier, the vehicle speed monitor 106 also records the ID of the onramp 112. The block 202 may be followed by the block 204.

In the block 204, the vehicle speed monitor 106 measures and records vehicle data for determining scalar instantaneous speeds of the vehicle 110. The vehicle speed monitor 106 measures and records vehicle data such as instantaneous accelerations of the vehicle 110 along three axes over time. As explained in more detail below, the vehicle speed monitor 106 may optionally determine and record the scalar instantaneous speeds of the vehicle 110 over time from the recorded instantaneous accelerations, and the scalar instantaneous speeds become part of the vehicle data. The block 204 may be followed by the block 206.

In the block 206, the driver or another occupant of the vehicle 110 returns the vehicle speed monitor 106 to the exit booth 108 before the vehicle 110 leaves the road 102 via the off ramp 114. The computer system 109 downloads, with or without contact, the recorded vehicle data and the recorded ID of the onramp 112 from the vehicle speed monitor 106. The block 206 may be followed by the block 208.

In the block 208, the computer system 109 uses software to determine if any speed limit has been violated. When the vehicle data do not include the scalar instantaneous speeds of the vehicle 110, the computer system 109 uses software to calculate the scalar instantaneous speeds of the vehicle 110 from the recorded instantaneous accelerations. The computer system 109 then determines any speed limit violation based on the scalar instantaneous speeds of the vehicle 110 and one or more speed limits for the road 102 between the onramp 112, which is identified by its recorded ID, and the off ramp 114. The computer system 109 looks up the one or more speed limits based on the IDs of the onramp 112 and the off ramp 114 in a speed limit database. The block 208 may be followed by the block 210.

In the block 210, the computer system 109 may calculate a fine for any speed limit violation. The computer system 109 may also calculate any toll based on the IDs of the onramp 112 and the off ramp 114.

Figure 3:
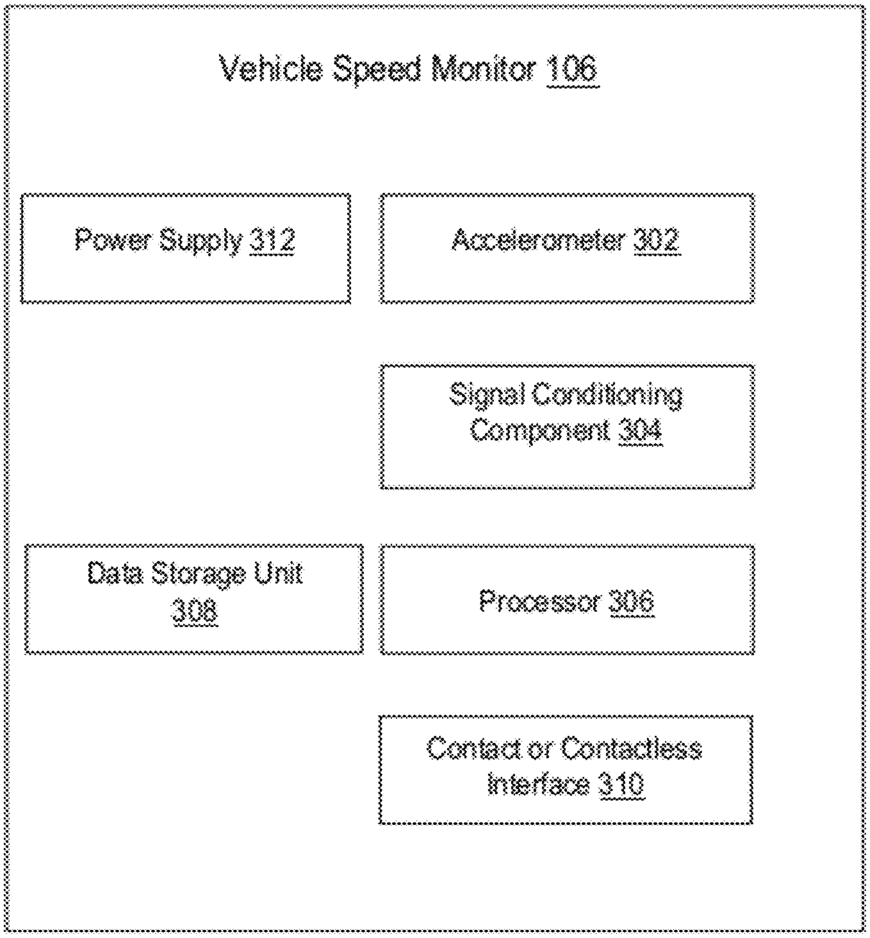
FIG. 3 shows a block diagram of an illustrative embodiment of a vehicle speed monitor for recording vehicle speed data.

FIG. 3 shows a block diagram of an illustrative embodiment of the vehicle speed monitor 106 for recording vehicle data. The vehicle speed monitor 106 includes an accelerometer 302, a signal conditioning component 304, a processor 306, a data storage unit 308, a contact or contactless interface 310, and a power supply 312.

The outputs of accelerometer 302 are coupled to the inputs of the signal conditioning component 304. The outputs of the signal conditioning component 304 are coupled to the processor 306. The processor 306 is coupled to the data storage unit 308 and the contact or contactless interface 310. The power supply 312 provides power to the appropriate components in the vehicle speed monitor 106 depending on if the vehicle speed monitor 106 is active (uses internal power for all functions) or semi-active (uses external power from an external source that is reading or writing the vehicle speed monitor).

The accelerometer 302 is a three-axis accelerometer that measures instantaneous accelerations along three axes. The accelerometer 302 may output the instantaneous accelerations as analog or digital signals. The accelerometer 302 may be a MEMS (micro-electromechanical systems) 3-axis accelerometer available from MEMSIC, Inc. of Andover, Mass.

The signal conditioning component 304 converts the instantaneous acceleration signals into a digital format compatible with a contact or contactless IC card reader and/or writer. The signal conditioning component 304 may amplify, filter, linearly compensate, isolate, and encrypt the instantaneous acceleration signals. The signal conditioning component 304 outputs the reformatted instantaneous accelerations to the processor 306, which records them in the data storage unit 308. The data storage unit 308 may include nonvolatile memory such as an EEPROM (electrically erasable programmable read-only memory) for storing data and a read-only memory (ROM) for storing an operating system and applications executed by the processor 306.

The processor 306 optionally reads the recorded instantaneous accelerations from the data storage unit 308, determines the scalar instantaneous speeds from the recorded instantaneous accelerations, and records the scalar instantaneous speeds in the data storage unit. Alternatively the computer system 109 determines the scalar instantaneous speeds from the recorded instantaneous accelerations.

The computer system 105 includes a contact or contactless IC card writer. The computer system 105 uses the contact or contactless IC card writer to write the ID of the onramp 112 into the vehicle speed monitor 106. The contact or contactless interface 310 receives the ID from the contact or contactless IC card writer and passes it to the processor 306, which records the ID into the data storage unit 308. The computer system 109 includes a contact or contactless IC card reader. The computer system 109 uses the contact or contactless IC card reader to download the recorded vehicle data from the vehicle speed monitor 106. The contact or contactless interface 310 passes the download command to the processor 306, which reads the data storage unit 308 and transmits the recorded vehicle data via the contact or contactless interface to the computer system 109. The vehicle data may be the recorded instantaneous accelerations, the recorded scalar instantaneous speeds if available, or both. The contact or contactless communication between the vehicle speed monitor 106 and the contact or contactless IC card reader and writer may conform to standards such as ISO14443, ISO 7816, PC/SC (Personal Computer/Smart Card), and GSM (Global System for Mobile Communications) 11.11.

Figure 4:
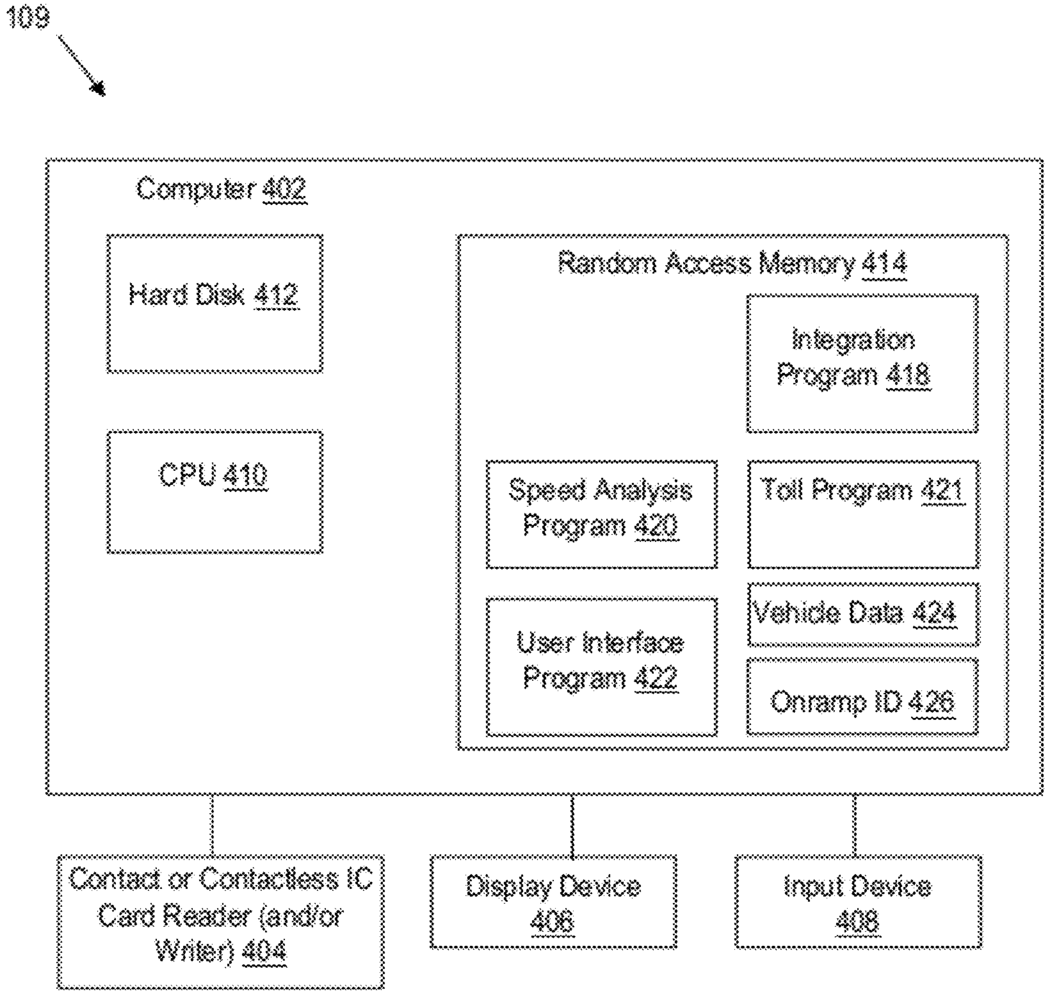
FIG. 4 shows a block diagram of an illustrative embodiment of the computer system of FIG. 1 for communicating with the vehicle speed monitor of FIG. 3.

FIG. 4 shows a block diagram of an illustrative embodiment of the computer system 109 for communicating with the vehicle speed monitor 106. The computer system 109 includes a computer 402, a contact or contactless IC card reader 404, a display device 406, and an input device 408. The computer 402 includes a central processing unit (CPU) 410, a hard disk 412, and random access memory (RAM) 414. The hard disk 412 stores software that is loaded into the RAM 414 for execution, including an integration program 418, a speed analysis program 420, a toll program 421, and a user interface program 422. The RAM 414 also stores vehicle data 424 and an onramp ID 426 of the onramp 112.

The CPU 410 is coupled to the contact or contactless IC card reader 404, the display device 406, the input device 408, the hard disk 412, and the RAM 414. The CPU 410 uses the contact or contactless IC card reader 404 to download the vehicle data 424 and the onramp ID 426 from the vehicle speed monitor 106. The CPU 410 saves the vehicle data 424 and the onramp ID 426 in the RAM 414 and the hard disk 412. The vehicle data 424 may be the recorded scalar instantaneous accelerations, the recorded instantaneous speeds if available, or both.

When the vehicle data 424 contain only the recorded instantaneous accelerations, the CPU 410 executes the integration program 418 to determine the scalar instantaneous speeds over time. For example, the integration program 418 calculates the scalar instantaneous accelerations at each unit of time from the recorded instantaneous accelerations along the three axes at each unit of time, and then the integration program 418 calculates the scalar instantaneous speeds at each unit of time by integrating the scalar instantaneous accelerations over time. The integration program 418 optionally calculates the distances traveled at each unit of time by integrating the scalar instantaneous speeds over time. This allows the scalar instantaneous speeds to be correlated to locations of the vehicle 110 along the road 102.

The integration program 418 may also determine if the scalar instantaneous speeds should be adjusted. When a low speed occurs for an excessive amount of time, such as under 3 km/hour for more than 30 minutes, the integration program 418 may set the low speed as zero and adjust the subsequent scalar instantaneous speeds accordingly.

The CPU 410 executes the speed analysis program 420 to determine if any speed limit has been exceeded on the road 102 from the onramp 112 to the off ramp 114. The speed analysis program 420 determines one or more speed limits of road 102 between the onramp 112 and the off ramp 114 from a speed limit database. The speed analysis program 420 may look up the one or more speed limits in a local or remote database using the IDs of the onramp 112 and the off ramp 114.

The speed analysis program 420 compares the one or more speed limits against the scalar instantaneous speeds over time to determine if the one or more speed limits have been exceeded for an excessive amount of time (e.g., from seconds to minutes) and calculates fines for any speed limit violation. When there are multiple speed limits, then the speed limits along the road may be compared against the scalar instantaneous speeds of the vehicle 110 and their corresponding locations along the road. The corresponding locations of the vehicle 110 are determined from the distances traveled along the road 102, which are calculated from the integration of the scalar instantaneous speeds.

The CPU 410 executes the toll program 421 to determine a toll for travelling on the road 102 from the onramp 112 to the off ramp 114. The toll program 421 may look up the toll in a local or remote database using the IDs of the onramp 112 and the off ramp 114.

The CPU 410 executes the user interface program 422 to generate a user interface to the integration program 418 and the speed analysis program 420. The CPU 410 outputs the user interface to the display device 406, and receives user input through the input device 408.

The computer system 105 may be similarly configured as computer system 109 but includes a contact or contactless IC card writer 404 to record the onramp ID 426 of the onramp 112 into the vehicle speed monitor 106.

Figure 5:
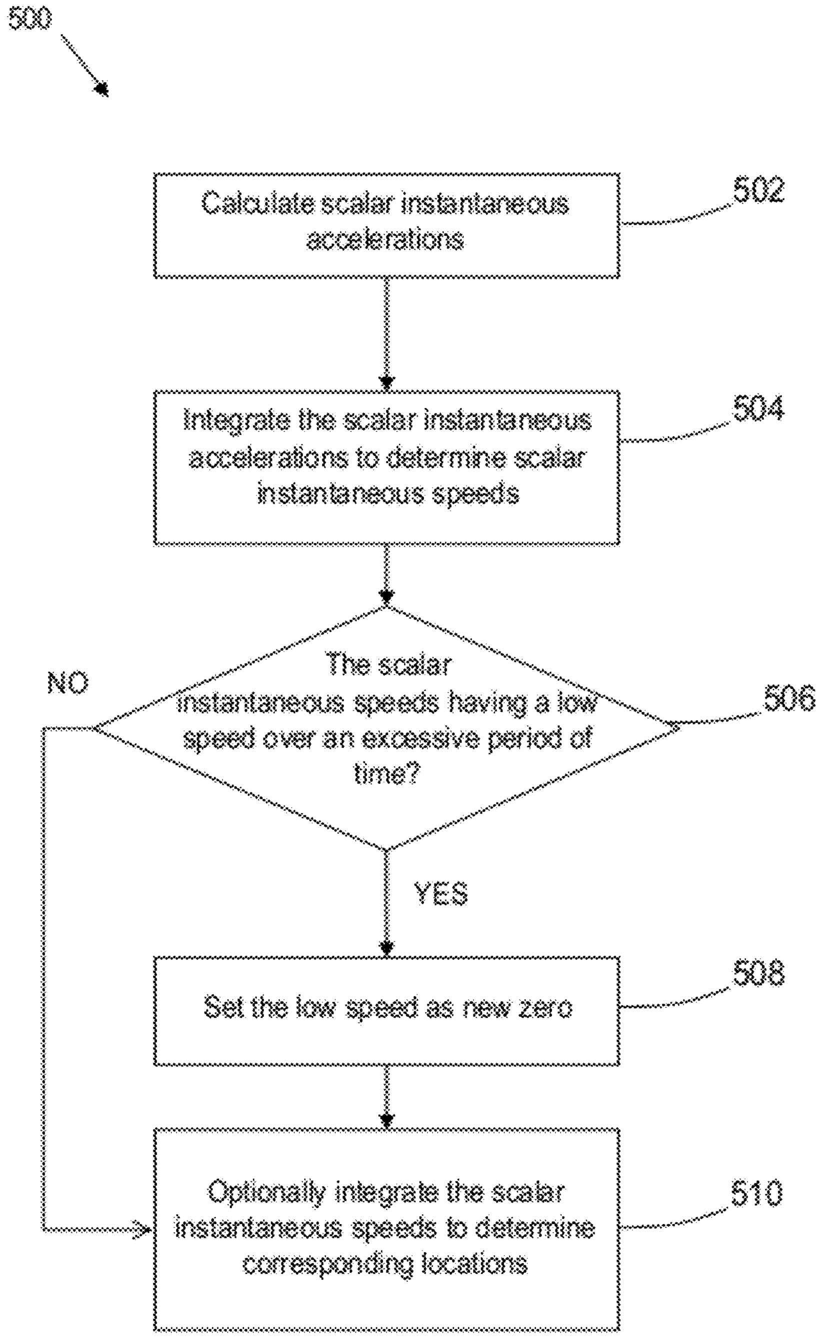
FIG. 5 is a flowchart of an illustrative embodiment of a method for integrating scalar instantaneous accelerations to obtain scalar instantaneous speeds.

FIG. 5 is a flowchart of an illustrative embodiment of a method 500 for integrating scalar instantaneous accelerations to obtain scalar instantaneous speeds. The method 500 may comprise one or more operations, functions or actions as illustrated by one or more of blocks 502, 504, 506, 508, and 510. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for the method 500 may begin at the block 502, "Calculate scalar instantaneous accelerations." The block 502 may be followed by the block 504, "Integrate the scalar instantaneous accelerations to determine scalar instantaneous speeds." The block 504 may be followed by the block 506, "The scalar instantaneous speeds having a low speed over an excessive period of time?" In a "Yes" path, the block 506 may be followed by the block 508, "Set the low speed as new zero." In a "No" path, block 506 may be followed by the block 510. The block 508 may be followed by the block 510, "Optionally integrate the scalar instantaneous speeds to determine corresponding locations."

In the block 502, the integration program 418, executed by the CPU 410, determines the scalar instantaneous accelerations at each unit of time. The integration program 418 calculates the scalar instantaneous accelerations at each unit of time from the recorded instantaneous accelerations along the three axes at each unit of time. The block 502 may be followed by the block 504.

In the block 504, the integration program 418 calculates the scalar instantaneous speeds at each unit of time by integrating the scalar instantaneous accelerations over time. The lock 504 may be followed by the block 506.

In the block 506, the integration program 418 determines if a low speed occurred for an excessive amount of time, such as under 3 km/hour for over 30 minutes. When a low speed occurred only for a short period, then the scalar instantaneous speeds determined in the block 504 are assumed to be normal and the block 506 may be followed by the block 510. When a low speed occurred for an excessive amount of time, then the scalar instantaneous speeds determined in block 504 should be adjusted and the block 506 may be followed by the block 508.

In the block 508, the integration program 418 sets the low speed as the new zero speed and adjust subsequent scalar instantaneous speeds accordingly. The block 508 may be followed by the block 510.

In the block 510, the integration program 418 optionally calculates the distances traveled at each unit of time by integrating the scalar instantaneous speeds over time. This allows the scalar instantaneous speeds to be correlated to the locations of the vehicle 110 along the road 102.

As an alternative to the block 508 of setting the low speed as the new zero, the scalar instantaneous speeds may be calibrated with a small number of Doppler velocimeters along the road 102. The Doppler velocimeters measure the vehicle's speeds at certain fixed locations. Cameras may be located at these locations to capture the identity of the vehicle 110, such as by capturing the vehicle's license plate. The measured speeds and their locations of the vehicle 110, along with the identity of the vehicle 110, are transmitted to the computer system 109 at the exit booth 108. The measured speeds and their locations are then used to calibrate the scalar instantaneous speeds and their locations determined from the vehicle speed monitor 106.

Figure 6:
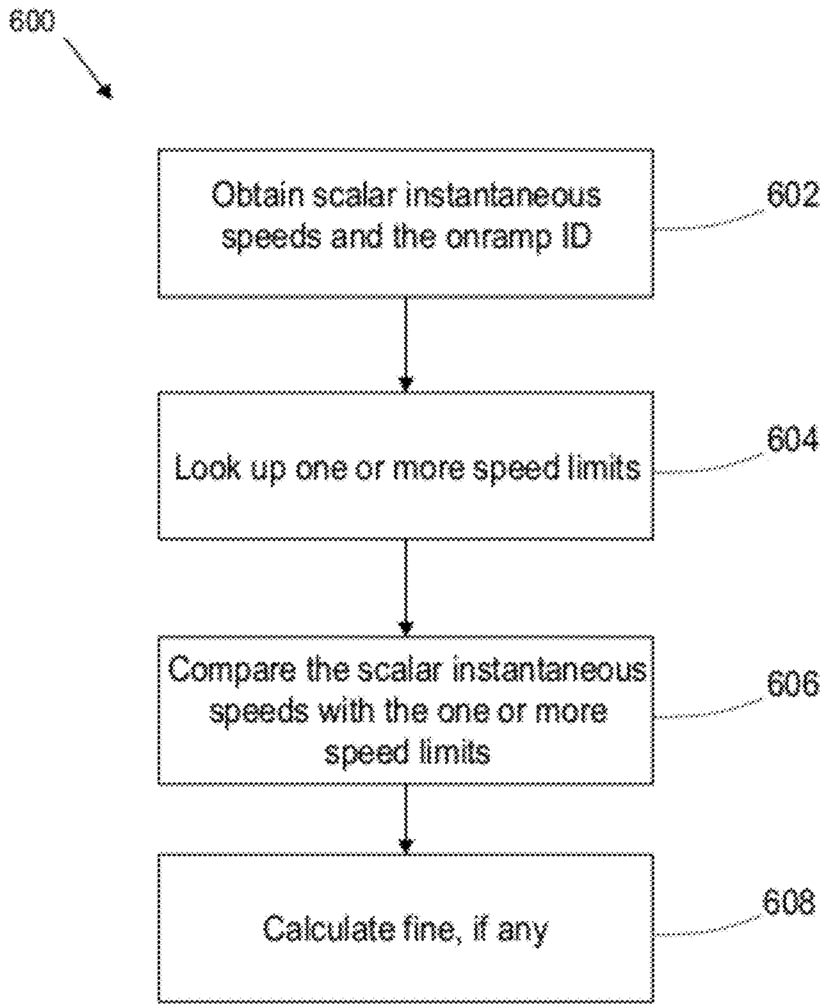
FIG. 6 is a flowchart of an illustrative embodiment of a method for determining any speeding violation from the scalar instantaneous speeds.

FIG. 6 is a flowchart of an illustrative embodiment of a method 600 for determining any speeding violation from the scalar instantaneous speeds. The method 600 may comprise one or more operations, functions or actions as illustrated by one or more of blocks 602, 604, and 606. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for the method 600 may begin at the block 602, "Obtain scalar instantaneous speeds and the onramp ID." The block 602 may be followed by the block 604, "Look up one or more speed limits." The block 604 may be followed by the block 606, "Compare the scalar instantaneous speeds with the one or more speed limits." The block 606 may be followed by the block 608, "Calculate fines, if any."

In the block 602, the speed analysis program 420, executed by the CPU 410, obtains the scalar instantaneous speeds determined by the vehicle speed monitor 106 or the integration program 418 and the onramp ID 426 of the onramp 112. The block 602 may be followed by the block 604.

In the block 604, the speed analysis program 420 determines one or more speed limits of the road 102 between the onramp 112 and the off ramp 114 from a database. The speed analysis program 420 may look up the one or more speed limits in a local or remote database using the IDs of the onramp 112 and the off ramp 114. The block 604 may be followed by the block 606.

In the block 606, the speed analysis program 420 compares the scalar instantaneous speeds with the one or more speed limits to determine if any speed limit has been exceeded for an excessive duration. When the road 102 from the onramp 112 to the off ramp 114 has multiple speed limits, then the speed limits along the road may be compared against the scalar instantaneous speeds and their corresponding locations along the road determined from the integration of the scalar instantaneous speeds. The block 606 may be followed by the block 608.

In the block 608, the speed analysis program 420 calculates a fine for any speed limit that has been exceeded.

Figure 7:
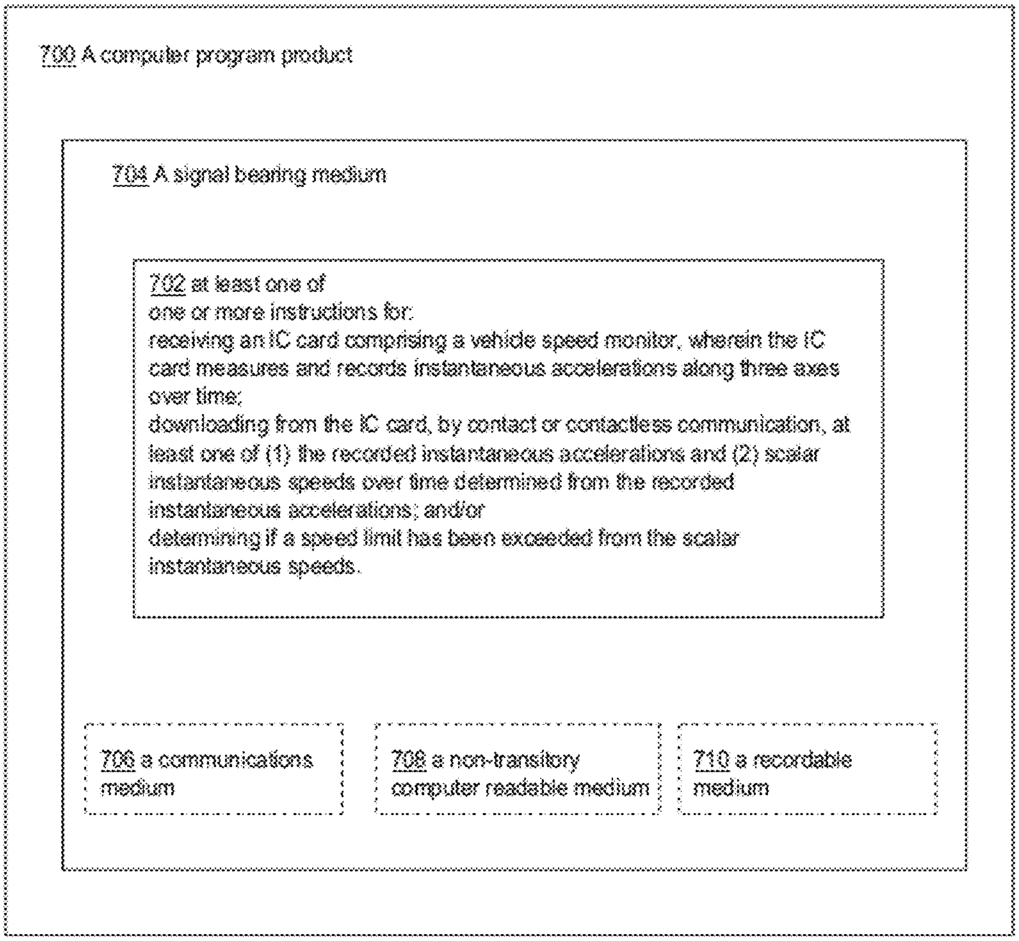
FIG. 7 is a schematic diagram illustrating a computer program product for a computing device to monitor the speed of a moving vehicle.

FIG. 7 is a block diagram of an illustrative embodiment of a computer program product 700 for implementing a method for monitoring the speed of a moving vehicle. The computer program product 700 may include a signal bearing medium 704. The signal bearing medium 704 may include one or more sets of executable instructions 702 that, when executed by, for example, a processor or CPU, may provide the functionality described above with respect to FIGS. 2, 5, and 6. Thus, for example, referring to the computer 402 of FIG. 4, the CPU 410 of the computer 402 may undertake one or more of the blocks shown in FIGS. 5 and 6 in response to the instructions 702 conveyed to the computer 402 by the signal bearing medium 704.

In some implementations, the signal bearing medium 704 may encompass a non-transitory computer readable medium 708, such as, but not limited to, a hard disk drive, a Compact Disc (CD), a Digital Video Disk (DVD), a digital tape, memory, etc. In some implementations, the signal bearing medium 704 may encompass a recordable medium 710, such as, but not limited to, memory, read/write (R/W) CDs, R/W DVDs, etc. In some implementations, the signal bearing medium 704 may encompass a communications medium 706, such as, but not limited to, a digital and/or an analog communication medium (e.g., a fiber optic cable, a waveguide, a wired communications link, a wireless communication link, etc.). Thus, for example, referring to the computer 402 of FIG. 4, the computer program product 700 may be wirelessly conveyed to the computer 402 by the signal bearing medium 704, where the signal bearing medium 704 is conveyed to the computer 402 by a wireless communications medium 706 (e.g., a wireless communications medium conforming with the IEEE 802.11 standard). The computer program product 700 may be recorded on the non-transitory computer readable medium 708 or another similar recordable medium 710.

Figure 8:
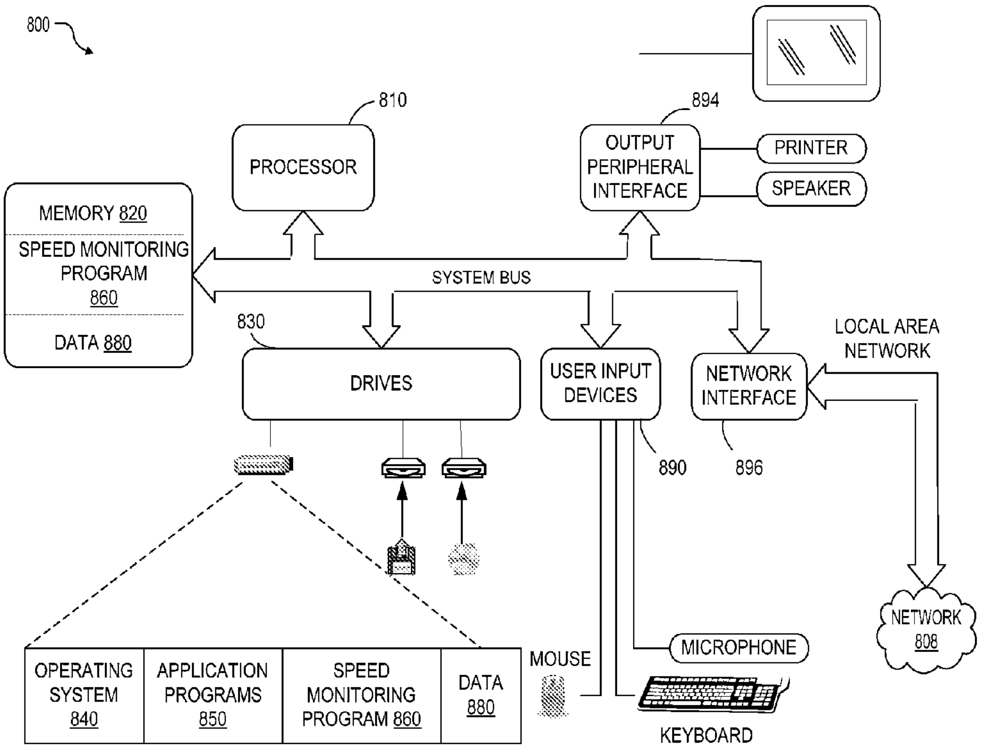
FIG. 8 is a block diagram illustrating an example computing device that is arranged for monitoring the speed of a moving vehicle.

FIG. 8 is a block diagram illustrating an example computing device 800 that is arranged for monitoring the speed of a moving vehicle in accordance with the present disclosure. The computing device 800 may be a computer includes a processor 810, memory 820, and one or more drives 830. The drives 830 and their associated computer storage media, provide storage of computer readable instructions, data structures, program modules and other data for the computer 800. The drives 830 can comprises an operating system 840, application programs 850, a speed monitoring program 860, and data 880. The computer 800 further includes user input devices 890 through which a user may enter commands and data. Input devices can comprises an electronic digitizer, a microphone, a keyboard and pointing device, commonly referred to as a mouse, trackball or touch pad. Other input devices may comprise a joystick, game pad, satellite dish, scanner, or the like.

These and other input devices can be connected to the processor 810 through a user input interface that is coupled to a system bus, but may be connected by other interface and bus structures, such as a parallel port, game port or a universal serial bus (USB). Computers such as computer 800 may also comprise other peripheral output devices such as speakers, which may be connected through an output peripheral interface 894 or the like.

The computer 800 may operate in a networked environment using logical connections to one or more computers, such as a remote computer connected to a network interface 896. The remote computer may be a personal computer, a server, a router, a network PC, a peer device or other common network node, and can comprises many or all of the elements described above relative to the computer 800. Networking environments are commonplace in offices, enterprise-wide area networks (WAN), local area networks (LAN), intranets and the Internet. For example, in the subject matter of the present application, the computer 800 may comprise the source machine from which data is being migrated, and the remote computer may comprise the destination machine or vice versa. Note however, that source and destination machines need not be connected by a network 808 or any other means, but instead, data may be migrated via any media capable of being written by the source platform and read by the destination platform or platforms. When used in a LAN or WLAN networking environment, the computer 800 is connected to the LAN through the network interface 896 or an adapter. When used in a WAN network environment, the computer 800 typically includes a modem or other means for establishing communications over the WAN, such as the Internet or network 808. It will be appreciated that other means of establishing a communications link between the computers may be used.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium comprises, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable comprise but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would comprises but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would comprises but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to comprises the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A vehicle speed monitor for monitoring speed of a moving vehicle, the vehicle speed monitor comprising:
- an integrated circuit (IC) card, the IC card comprising:
  - an accelerometer being configured to measure instantaneous accelerations of the vehicle along three axes;
  - a nonvolatile memory;
  - a contact or contactless interface; and
  - a processor being programmed to record the instantaneous accelerations measured by the accelerometer over time in the nonvolatile memory and to transmit, via the contact or contactless interface, at least one of (1) the recorded instantaneous accelerations and (2) scalar instantaneous speeds over time determined from the recorded instantaneous accelerations.

2. The vehicle speed monitor of claim 1, wherein the IC card further comprises a signal conditioning component configured to reformat the instantaneous accelerations measured by the accelerometer and that provides the reformatted instantaneous accelerations to the processor for recording in the nonvolatile memory.

3. The vehicle speed monitor of claim 1, wherein the processor is programmed to calculate scalar instantaneous accelerations over time from the recorded instantaneous accelerations, to calculate the scalar instantaneous speeds over time from the scalar instantaneous accelerations, and to record the scalar instantaneous speeds in the nonvolatile memory.

4. The vehicle speed monitor of claim 1, wherein the processor is programmed to transmit an ID of an entrance of a road along with the recorded instantaneous accelerations via the contact or contactless interface, the entrance being where the vehicle speed monitor is provided to the vehicle.

5. A system for monitoring speed of a moving vehicle, comprising:
- a vehicle speed monitor comprising:
  - an integrated circuit (IC) card, the IC card comprising:
    - an accelerometer being configured to measure instantaneous accelerations of the vehicle along three axes;
    - a nonvolatile memory;
    - a contact or contactless interface; and
    - a processor being programmed to record the instantaneous accelerations measured by the accelerometer over time in the nonvolatile memory; and
- a computer system, comprising:
  - a contact or contactless reader; and
  - an other processor being programmed to:
    - download from the vehicle speed monitor, via the contact or contactless reader, at least one of (1) the recorded instantaneous accelerations and (2) scalar instantaneous speeds over time determined from the recorded instantaneous accelerations; and
    - determine if a speed limit has been exceeded from the scalar instantaneous speeds.

6. The system of claim 5, wherein the other processor is programmed to download an ID of an entrance of a road along with the recorded instantaneous accelerations, the entrance being where the vehicle speed monitor is provided to the vehicle.

7. The system of claim 6, wherein the other processor is further programmed to calculate scalar instantaneous accelerations over time from the recorded instantaneous accelerations, and the scalar instantaneous speeds over time from the scalar instantaneous accelerations.

8. The system of claim 7, wherein the other processor is further programmed to calibrate the scalar instantaneous speeds when the scalar instantaneous speeds remain at a low speed over a period of time by setting the low speed to zero.

9. The system of claim 7, wherein the other processor is further programmed to determine locations over time from the scalar instantaneous speeds.

10. The system of claim 7, wherein the other processor is further programmed to determine the speed limit based on the ID of the entrance and an other ID of an exit from the road, the exit being where the vehicle speed monitor is returned from the vehicle.

11. The system of claim 6, wherein the other processor is further programmed to calculate a toll based on the ID of the entrance and an other ID of an exit from the road, the entrance being where the vehicle speed monitor is provided to the vehicle and the exit being where the vehicle speed monitor is returned from the vehicle.

12. The system of claim 5, wherein the processor is programmed to calculate scalar instantaneous accelerations over time from the recorded instantaneous accelerations, and the scalar instantaneous speeds over time from the scalar instantaneous accelerations.

13. The system of claim 5, wherein the accelerometer is a micro-electro-mechanical systems (MEMS) accelerometer.

14. A method for monitoring speed of a moving vehicle, comprising:

providing a vehicle speed monitor comprising an integrated circuit (IC) card to the vehicle at an entrance of a road, wherein the vehicle speed monitor measures and records instantaneous accelerations of the vehicle along three axes over time;

receiving the vehicle speed monitor at an exit from the road;

downloading from vehicle speed monitor, by contact or contactless communication, at least one of (1) the recorded instantaneous accelerations and (2) scalar instantaneous speeds over time determined from the recorded instantaneous accelerations; and determining if a speed limit has been exceeded from the scalar instantaneous speeds.

15. The method of claim 14, further comprising:

prior to said providing the vehicle speed monitor, recording an ID of the entrance in the vehicle speed monitor; and after receiving the vehicle speed monitor, calculating the speed limit of the road based on the ID of the entrance and an other ID of the exit.

16. The method of claim 14, further comprising determining scalar instantaneous accelerations over time from the recorded instantaneous accelerations, and determining the scalar instantaneous speeds over time from the scalar instantaneous accelerations.

17. The method of claim 16, further comprising calibrating the scalar instantaneous speeds when the scalar instantaneous speeds remain at a low speed over a period of time by setting the low speed to zero.

18. The method of claim 16, further comprising determining locations over time from the scalar instantaneous speeds.

19. The method of claim 14, further comprising:

prior to said providing the vehicle speed monitor, recording an ID of the entrance in the vehicle speed monitor; and after receiving the vehicle speed monitor, calculating a toll of the vehicle based on the ID of the entrance and an other ID of the exit.

* * * * *